July 3, 1934.  C. E. STARR  1,965,266
SPEED CHANGE AXLE
Filed Oct. 31, 1932  2 Sheets-Sheet 1
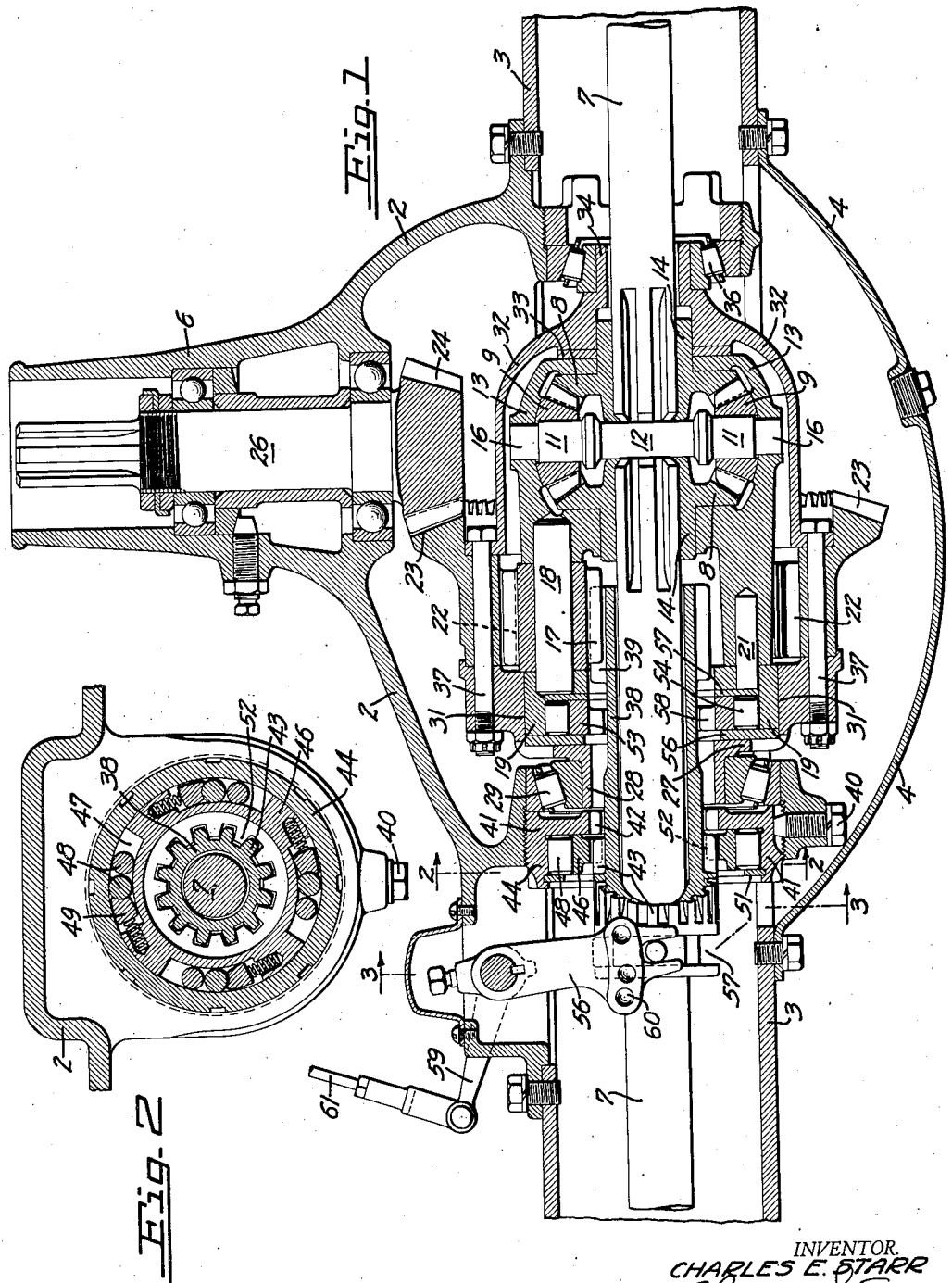
INVENTOR.
CHARLES E. STARR
BY Charles L. Evans
HIS ATTORNEY

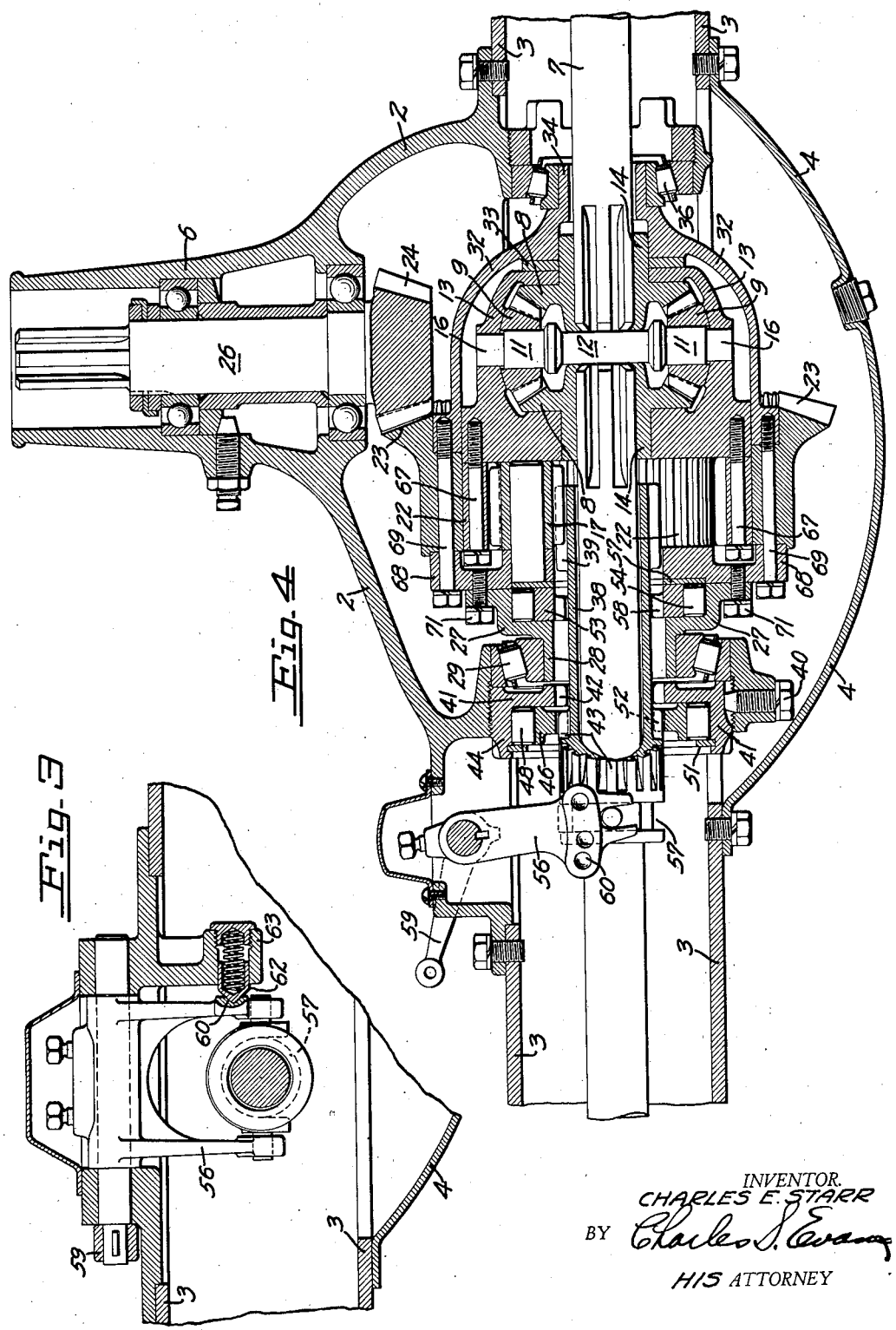

Patented July 3, 1934

1,965,266

UNITED STATES PATENT OFFICE 1,965,266

SPEED CHANGE AXLE

Charles E. Starr, Whittier, Calif., assignor to Perfecto Gear Differential Co., Los Angeles, Calif., a corporation of Washington Application October 31, 1932, Serial No. 640,449

16 Claims. (Cl. 74—99)

My invention relates to rear axles of motor vehicles, and particularly to those embodying combined planetary and differential gear systems.

It is among the objects of my invention to provide an axle of the character described in which the planetary gear system affords several speed changes, and in conjunction with which one or more one-way clutches are embodied, providing free-wheeling at selected speeds.

Another object of my invention is to provide an improved arrangement of gears, clutches and shifting mechanisms, whereby the speed changes are simply effected, and with an optional inclusion of the free-wheeling principle.

A further object of my invention is the provision of a mechanism of the character described which may readily be installed in existing rear axle housings.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a horizontal sectional view of the speed change axle embodying my invention.

Figure 2 is a vertical sectional view taken in a plane indicated by the line 2—2 of Figure 1; and shows further detail of the one-way clutch construction.

Figure 3 is a vertical sectional view taken in a plane indicated by the line 3—3 of Figure 1; and shows further detail of the shifting mechanism.

Figure 4 is a view similar to Figure 1; and shows a modified form of the speed change axle embodying my invention.

In terms of broad inclusion, the speed change axle embodying my invention comprises the combination with a differential gear system of a planetary gear system in which one of the gears of the planetary system is mounted for rotation with the differential casing of the differential gear system. Means are provided for optionally locking one of the gears of the planetary system against rotation, or locking the planetary gear system for rotation as one; and means are preferably included in the gear or stress train provided by said gear systems for permitting free rotation of a driven or stressed part of the train when there is a tendency for that part to overrun an adjacent driving or stressing part.

In greater detail, the speed change axle of my invention is shown in two forms; one embodying an underdrive, and the other an overdrive. The first embodiment, as shown in Figures 1 to 3, preferably comprises a housing 2 adapted for mounting on the inner side of the ordinary differential housing 3 of an automobile. A cover plate 4 is provided over the outer side of the differential housing 3 in the usual manner. The housing 2 is provided with a neck 6, to which the torque tube of the automobile connects.

The rear axles 7 of the automobile project into the housings, and are connected together by a differential gear system comprising the differential gears 8 mounted on the ends of the axles, and the differential pinions 9 meshing with the gears 8 and journaled on the arms 11 of a spider 12 which extends transversely between the ends of the axles. The differential assembly is enclosed in a casing 13 journaled on the hubs 14 of the gears 8. The spider 12 is supported by the casing 13; this support being effected by the arm extensions 16 seated in suitable sockets provided in the casing.

A planetary gear system is also provided, operable in combination with the differential gear system, and includes an intermediate gear 17 journaled on a shaft 18; one end of the shaft being secured in the differential casing 13 and the other end being secured in a bearing ring 19. In effect, the bearing ring 19 comprises a part of the differential casing; it being connected thereto by the intermediate gear shaft 18 and a pin 21. Consequently, the intermediate gear 17 is journaled on the differential casing. The outer or ring gear 22 of the differential system meshes with the intermediate gear 17, and is connected with the master gear 23; the outer and master gears being preferably formed as an integral unit.

The master gear is in mesh with a driving pinion 24 carried on the end of a stub shaft 26 journaled in the housing neck 7; it being understood of course that the stub shaft 26 connects with the propeller shaft of the automobile. The outer and master gear unit is supported at one end by a bell-shaped casing 27, a tubular neck 28 of which is journaled in the bearing 29. This bearing is preferably a cone type of roller bearing, as it is required to absorb both radial and thrust loads. The casing 27 is also provided with a cylindrical portion 31 which affords a journal for the bearing ring 19.

The other end of the outer and master gear unit is supported by another bell-shaped casing 32 which also surrounds the differential mechanism. The latter casing is journaled on the gear hub 14, and is spaced from the differential casing 13 by a bearing plate 33. A tubular neck 34 is also provided on the casing 32, which neck is journaled in the bearing 36. Bolts 37 are provided to extend through the casings 27 and 32 and the outer and master gear unit, and serve to bind these elements into a unitary structure.

A sleeve 38 is provided, journaled on one of the axles and free to be shifted axially thereof. Formed integrally with the sleeve at one end thereof is the inner or sun gear 39 of the planetary gear system, the teeth of which mesh with the teeth of the intermediate gear 17. A ring-shaped fixed element 41 having clutch teeth 42 formed thereon is threadedly secured to the housing and locked thereto by a screw 40. Clutch teeth 43 engageable with the teeth 42 are provided on the sleeve 38 for the purpose of locking the sleeve with the fixed element.

When the sleeve 38 is shifted to the right from its position as shown in Figure 1, and the inner gear 39 is thereby locked against rotation in both directions by virtue of its being positively locked with the fixed element, the driving torque from the propeller shaft causes rotation of the outer gear 22 and effects planetary rotation of the intermediate gear 17 about the stationary inner gear 39, with a corresponding turning of the differential casing and mechanism to drive the axle shafts. The above arrangement provides a train of stresses thru the gear systems which results in a speed reduction between the driving pinion and the axles, as will be readily understood. When the sleeve is locked to the fixed element, as described above, the drive from the propeller shaft to the rear axles is positive in both directions of rotation of the propeller shaft. In this position of the sleeve the car may be driven either forward or in reverse.

Means are provided, adapted to be interposed in the stress train provided by the gear systems, to permit free-wheeling at the low speed. For this purpose a one-way brake is provided, and means are provided for interposing it between parts of the planetary system. Preferably the brake is interposed between the inner gear 39 and the fixed element 41, so as to lock the inner gear against rotation in one direction only. As best shown in Figures 1 and 2, this brake preferably comprises a bearing ring 44 preferably formed integrally with the fixed element 41, and within which a slip ring 46 is journaled. Notches 47 are provided in the periphery of the slip ring, and are formed so that one end is deeper than the other. Note Figure 2. A pair of rollers 48 are disposed in each of the notches, and the proportions of the various parts are such that each of the rollers is in contact with the other as well as with the bottom of the notch and the inner surface of the bearing ring 44.

A spring pressed follower block 49 is provided behind the larger of the rollers 48, and serves to urge the rollers toward the shallow end of the notch. A plate 51 is provided to hold the slip ring and rollers in position. Teeth 52 are also provided on the slip ring and are adapted for engagement with the teeth 43 of the sleeve 38.

Upon inspection of Figure 2 of the drawings, it will be seen that rotation of the slip ring 46 in a counter-clockwise direction with respect to the bearing ring 44, causes the rollers to be crowded toward the deep side of the notch and permits free rotation of the slip ring. Inversely, clockwise rotation of the slip ring causes the rollers to be turned toward the shallow side of the notch; the wedging action of the rollers between the bottom of the notch and the bearing ring serving to provide an effective lock to prevent relative rotation between the two.

When the sleeve is in the position shown in Figure 1, so that the one-way brake is interposed between the sleeve and the fixed element, the planetation of the pinion will continue only so long as the rotational balance between the propeller and axle shaft is preserved; viz., only while the torque is being applied to the axles from the propeller shaft. As soon as the rotation of the axles by the rear wheels exceeds their normal speed with relation to the propeller shaft, the torque applied to the inner or sun gear 39 will be reversed. Since the gear will run freely in the reverse direction, due to the action of the one-way brake, the axles are free to overrun the propeller shaft.

Means are provided for locking the gears of the planetary system together for rotation as one, to cut out the underdrive and provide a higher speed, and means are also interposed in the stress train provided by the gear systems to permit free-wheeling at the higher speed. To this end a one-way clutch is interposed between parts of the planetary and differential gear systems, and preferably between the inner gear 39 and the planet pinion mounting and differential casing unit 19—13. Journaled in the bearing ring 19 is a slip ring 53, provided with rollers 54 in the same manner as the one-way brake described above. The plates 56 and 57 are positioned to bear against the ends of the rollers 54 to prevent misalignment thereof. Teeth 58 are provided on the slip ring 53, complementary with the teeth of the inner gear 39, and are adapted to be engaged thereby upon shifting of the sleeve.

By shifting the sleeve to the left from its position as shown in Figure 1, so as to engage the teeth of the inner gear with the teeth 58 of the slip ring 53, and to simultaneously disengage the teeth 43, the planetary gearing is locked together for unitary rotation. This unitary rotation effects a direct couple between the propeller shaft and the axle shaft, and of course cuts out the underdrive. However, due to the presence of the one-way clutch, the unitary rotation obtains only while the ratio of rotation between the propeller shaft and the axles is maintained; that is, only while torque is being applied to the axles from the propeller shaft.

If the momentum of the vehicle tends to cause a rotation of the differential casing in excess of that of the master gear, the interposed one-way clutch releases the lock between the parts of the differential system. In this condition the inner gear 39 is left to run free and as a result the differential casing and its connected mechanism is permitted to rotate independently of the master gear. Consequently the axles are free to overrun the propeller shaft. This condition exists as long as the axles are rotating at a faster speed than their normal with relation to the master gear. When, due to loss of momentum of the vehicle or otherwise, the speed of the axles is decreased to again effect a rotational balance between the propeller shaft and the axles the one-way clutch is again locked to prevent relative rotation between the intermediate gear and the inner gear, and unitary rotation of the planetary gear system is again restored.

Means are provided for shifting the sleeve to engage the fixed element or either of the one-way devices; and means are further provided for latching the sleeve in the selected position. Referring to Figures 1 and 3, the shifting mechanism comprises a yoke 56 engaging an annular groove 57 in the sleeve 38. The yoke is mounted on a shaft 58 journaled in the housing 2, and the shaft is provided with a crank 59 connected with a suitable shifting lever by the rod 61. The latching of the sleeve in its several positions is accomplished by a spring pressed pin 62 slidable in a bracket 63 and adapted to engage one of the yoke seats 60 in each of the sleeve positions.

Figure 4 shows the speed change axle embodying an overdrive. The mechanism is similar to that shown in Figure 1, except that the outer gear of the planetary system is mounted for rotation with the differential casing, and the planetary pinion mounting is connected with the master gear. As shown in Figure 4, the outer gear 22 is formed separately, and is secured to the differential casing 33 by the screws 67. A supporting ring 68, on which the intermediate gear 17 is mounted, is connected to the master gear 23 by the screws 69, and the casing 27 is in turn secured to the pinion supporting ring 68 by the screws 71.

From the mechanism just described it will be readily understood that the planetary system is driven through the planet pinion mounting, and that the differential casing is driven by the outer gear.

In both embodiments of my invention, the broad combination of elements is the same. In reiteration, this comprises planetary and differential gear systems for connecting the driving pinion and driven shaft and providing a stress train for transmitting torque from the pinion to the shaft, and a one-way clutch interposed between stressing and stressed parts in the train.

I claim:

1. A speed change axle comprising a driving pinion, a driven shaft, a differential gear system having a rotatable element, a planetary gear system including a rotatable element mounted for rotation with said element of the differential gear system, said gear systems being interposed between the driving pinion and driven shaft for connecting said pinion and shaft and providing a stress train for transmitting torque from the pinion to the shaft, and a one-way clutch interposed between stressing and stressed parts in said train and located between the driving pinion and a part of the differential gear system.

2. A speed change axle comprising a driving pinion, a driven shaft, a differential gear system having a rotatable element, a planetary gear system including a rotatable element mounted for rotation with said element of the differential gear system, said gear systems being interposed between the driving pinion and driven shaft for connecting said pinion and shaft and providing a stress train for transmitting torque from the pinion to the shaft, a one-way clutch, and means for interposing said clutch between stressing and stressed parts in said train between the driving pinion and a part of the differential gear system.

3. The combination with a differential gear system having a differential casing, of a planetary gear system including a gear mounted for rotation with the differential casing, means for driving the planetary gear system, and a one-way clutch interposed between said driving means and a part of the differential gear system.

4. The combination with a differential gear system having a differential casing, of a planetary gear system including a gear mounted for rotation with the differential casing, and a one-way clutch interposed between parts of the planetary gear system.

5. The combination with a differential gear system having a differential casing, of a planetary gear system including a gear mounted for rotation with the differential casing, a fixed element, and a one-way brake interposed between a part of the planetary gear system and the fixed element.

6. The combination with a differential gear system having a differential casing, of a planetary gear system including a gear mounted for rotation with the differential casing, means for driving the planetary gear system, a fixed element, a one-way clutch interposed between said driving means and the differential gear system, and a one-way brake interposed between a part of the planetary gear system and the fixed element.

7. The combination with a differential gear system having a differential casing, of a planetary gear system including inner, outer and intermediate gears and having one of said gears mounted for rotation with the differential casing, and means for optionally holding the inner gear against rotation either in one or both directions.

8. The combination with a differential gear system having a differential casing, of a planetary gear system including inner, outer and intermediate gears and having one of said gears mounted for rotation with the differential casing, and means for optionally holding the inner gear against rotation or locking the planetary gear system for unitary rotation in one direction.

9. The combination with a differential gear system having a differential casing, of a planetary gear system including inner, outer and intermediate gears and having one of said gears mounted for rotation with the differential casing, and means for optionally holding the inner gear against rotation either in one or both directions or locking the planetary gear system for unitary rotation in one direction.

10. The combination with a differential gear system having a differential casing, of a planetary gear system including inner, outer and intermediate gears and having one of said gears mounted for rotation with the differential casing, a fixed element, means for optionally locking the inner gear to the fixed element or locking the planetary gear system for rotation as one, and a one-way clutch interposed between parts of the planetary gear system.

11. The combination with a differential gear system having a differential casing, of a planetary gear system including inner, outer and intermediate gears and having one of said gears mounted for rotation with the differential casing, a fixed element, means for optionally locking the inner gear to the fixed element or locking the planetary gear system for rotation as one, a one-way clutch interposed between parts of the planetary gear system, and a one-way brake interposed between the inner gear and the fixed element.

12. The combination with a differential gear system having a differential casing, of a planetary gear system including inner and outer gears and an intermediate gear mounted for planetary rotation, and having one of said gears mounted for rotation with the differential casing, and a one-way clutch interposed between the inner gear and the intermediate gear mounting.

13. The combination with a differential gear system having a differential casing, of a planetary gear system including inner and outer gears and an intermediate gear mounted for planetary rotation, and having one of said gears mounted for rotation with the differential casing, a fixed element, a one-way clutch interposed between the inner gear and the intermediate gear mounting, and a one-way brake interposed between the inner gear and the fixed element.

14. The combination with a differential gear system having a differential casing, of a planetary gear system including inner and outer gears and an intermediate gear mounted on the differential casing, and a one-way clutch interposed between the inner gear and the differential casing.

15. The combination with a differential gear system having a differential casing, of a planetary gear system including inner and outer gears and an intermediate gear mounted for planetary rotation, and having the outer gear mounted on the differential casing, and a one-way clutch interposed between the inner gear and the intermediate gear mounting.

16. The combination with a differential gear system having a differential casing, of a planetary gear system including inner and outer gears and an intermediate gear mounted for planetary rotation, and having one of said gears mounted for rotation with the differential casing, a fixed element, a one-way brake interposed between the inner gear and the fixed element, and means for optionally locking the inner gear directly to the fixed element or to said element through the one-way brake.

CHARLES E. STARR.